United States Patent
Sullivan et al.

(10) Patent No.: US 12,138,783 B2
(45) Date of Patent: Nov. 12, 2024

(54) ROBOTIC END-TOOL WITH DIVIDER RESTRAINING MECHANISM

(71) Applicant: RIOS Intelligent Machines, Inc., Palo Alto, CA (US)

(72) Inventors: Laura Sullivan, Redwood City, CA (US); Kent A. Evans, Cupertino, CA (US)

(73) Assignee: RIOS Intelligent Machines, Inc.

( * ) Notice: Subject to any disclaimer, the term of this patent is extended or adjusted under 35 U.S.C. 154(b) by 428 days.

(21) Appl. No.: 17/720,731

(22) Filed: Apr. 14, 2022

(65) Prior Publication Data
US 2023/0330868 A1 Oct. 19, 2023

(51) Int. Cl.
*B25J 15/06* (2006.01)
(52) U.S. Cl.
CPC ................ *B25J 15/0625* (2013.01)
(58) Field of Classification Search
CPC .......... B25J 15/0625; B25J 15/0095; B25J 15/0616; B65B 69/00
See application file for complete search history.

(56) References Cited

U.S. PATENT DOCUMENTS

| | | | |
|---|---|---|---|
| 9,498,887 B1* | 11/2016 | Zevenbergen | B25J 15/0052 |
| 2003/0103838 A1* | 6/2003 | Liehs | B65B 69/00 |
| | | | 414/403 |
| 2015/0209964 A1* | 7/2015 | Akama | B25J 9/0051 |
| | | | 294/183 |

* cited by examiner

*Primary Examiner* — Masud Ahmed
(74) *Attorney, Agent, or Firm* — Bever, Hoffman & Harms, LLP

(57) ABSTRACT

A robotic end-tool including a divider restraining mechanism that utilizes a movable foot structure to restrain divider inserts during the automated extraction of objects from a box using a robot mechanism. The end-tool includes a frame connected to the robotic mechanism and an object gripping device (e.g., a suction cup) connected to the frame. The foot structure is connected to one end of a guide rod that is restricted to move in an axial direction by a linear bearing that is attached to the frame. Before each automated extraction the robot mechanism manipulates the frame to position the object gripping device mechanism over a targeted object. During each extraction operation the foot structure applies and maintains a restraining force on the divider insert while object gripping device is manipulated by the robot mechanism to secure and then extract the selected object out of its associated storage compartment.

18 Claims, 11 Drawing Sheets

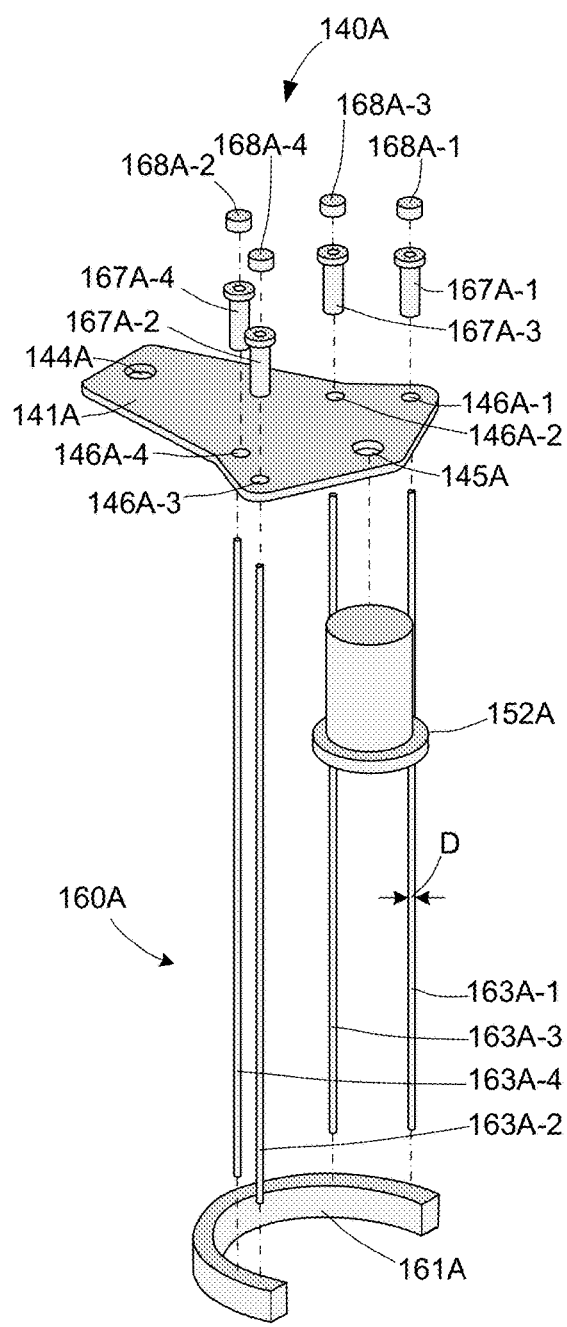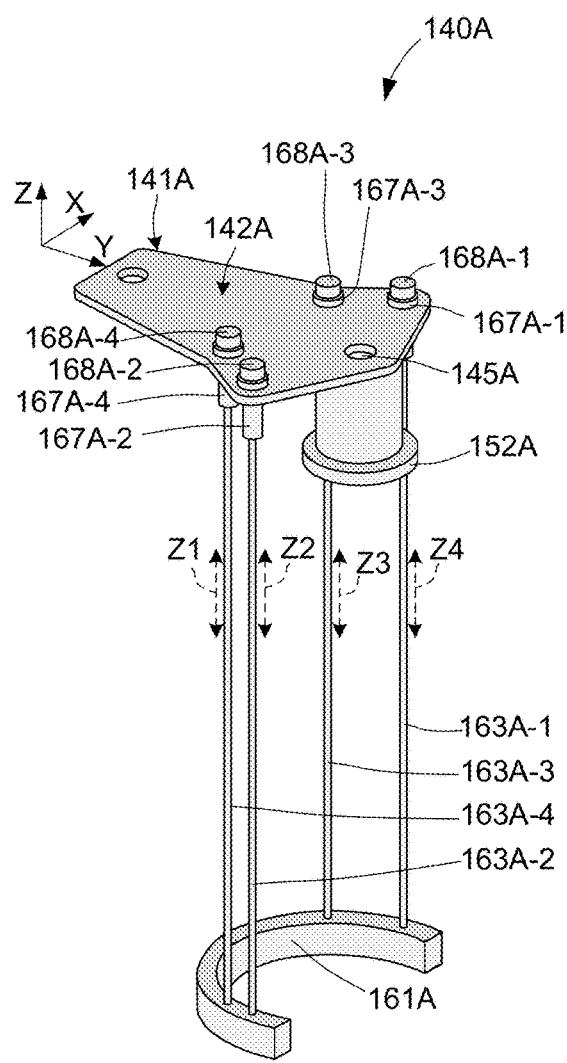
FIG. 4A
FIG. 4B

ROBOTIC END-TOOL WITH DIVIDER RESTRAINING MECHANISM

FIELD OF THE INVENTION

This invention relates generally to automated production systems, and more particularly to end-of-arm-tools (end-tools) utilized by robots to automatically remove objects from boxes in which the objects are separated by divider inserts.

BACKGROUND OF THE INVENTION

Promo (promotional) products (aka, swag or freebies) are low-cost consumer goods that are customized (i.e., branded with a logo or slogan) and given away or sold at a loss to promote an organization, corporate identity, or event. The consumer goods utilized as promo products are often mass produced in a generic (unlabeled) form and sold in bulk to wholesalers who then customize the promo products (i.e., supplementally process each promo product to include a printed or adhered label) to include an end-distributor's brand, logo and/or slogan.

FIG. 8 depicts a greatly simplified process involving the packaging, shipping, and customizing of unlabeled drinkware items 50U (e.g., covered drinking cups or bottles), which are currently a very popular type of promo product. Referring to the top of FIG. 8, each unlabeled drinkware item 50U is typically includes a cylindrical or conical side surface 51 and a substantially flat, circular closed bottom surface 52. Other details of drinkware item 50U (caps, spouts, etc.) are not relevant to the present invention and are therefore omitted for brevity. Arrow P1 indicates that manufacturers typically package unlabeled drinkware items 50U in cardboard boxes 60 using divider inserts 70 that function to protect individual drinkware items 50U from scratches or other damage during shipping and handling. After shipment (indicated by arrow P2) to a wholesaler who specializes in customizing promo products for distribution by its client companies, drinkware items 50U are extracted (unpacked) from boxes 60 and then moved to a processing device 80 (e.g., label applicator or printer) and reoriented/positioned for processing. As indicated by arrow P3, processing device 80 provides each completed drinkware item 50L with a brand/logo/slogan 53 on its side surface 51. The wholesaler then repackages or otherwise provides completed promo drinkware items 50L to a client customer for distribution to patrons and other end-user consumers, whereby subsequent use of promo drinkware 50L provides beneficial public exposure of the client customer's brand/logo/slogan 53.

FIGS. 9A to 9D depict the packaging portion of the process depicted in FIG. 8 in additional detail. FIG. 9A depicts the assembly of an exemplary divider insert 70, FIG. 9B depicts the use of divider insert 70 to divide the storage area 61 of a box 60 into multiple storage areas, FIG. 9C depicts the insertion of unlabeled drinkware items 50U into the storage compartments, and FIG. 9D depicts closure of box 60. The specific configuration of box 60 and divider insert 70 depicted in the figures and described below is selected solely for descriptive purposes and represent one of many possible configurations and are therefore not intended to be limiting.

Referring to FIG. 9A, divider insert 70 is assembled using two intercrossing sets 71 and 72 of elongated strips or sheets made of cardboard or a similar material. Set 71 includes three respectively including three parallel slits that extend vertically upward from each strip's lower edge and terminate before reaching the strip's upper edge, and set 72 includes three strips 72-1, 72-2 and 72-3 respectively including three parallel slits that extend vertically downward from each strip's upper edge. For example, as shown in FIG. 9A, slits 75-31, 75-32 and 75-33 extend upward from lower edge 71-3L of strip 71-3, and slits 76-11, 76-22 and 76-13 extend downward from upper edge 72-1U of strip 72-1. During assembly, sets 71 and 72 are combined in an intercrossed arrangement by way of engaging each slit formed on strips 71-1, 71-2 and 71-3 with a corresponding complementary slit formed on strips 72-1, 72-2 and 72-3. For illustrative purposes, strips 71-1, 71-2 and 71-3 are depicted in FIG. 9A as being arranged in parallel vertical (Y-Z) planes above strips 72-1, 72-2 and 72-3, which are arranged in parallel vertical (X-Z) planes that are substantially perpendicular to strips 71-1, 71-2 and 71-3. As indicated by the downward-directed dot-line arrows, strip 71-3 is arranged such that, when lowered onto set 72 during assembly, slits 75-31, 75-32 and 75-33 respectively engage with complementary slits 76-13, 76-23 and 76-33 (i.e., slit 75-31 engages with slit 76-13, slit 75-32 engages with slit 76-23 and slit 75-33 engages with slit 76-33), thereby connecting strip 71-3 to each strip of set 72. Strips 71-2 and 71-3 are lowered onto set 72 in a similar manner such that each of the three slits formed on strips 71-2 and 71-3 engages with a corresponding complementary slit formed on one of strips 72-1, 72-2 or 72-3. When assembled in this manner, the associated pairs of complementary slits facilitate an intercrossing connection of strip sets 71 and 72, thereby producing assembled divider 70, which is shown in FIG. 9B.

As depicted in FIG. 9B, after assembly, divider 70 is inserted (as indicated by the downward-pointing dotted-line arrows) into box 60. Storage region 61 is defined by two parallel end walls 62 and 63 and two parallel side walls 64 and 65, where each wall 62 to 65 is connected to and extends vertically upward from a corresponding outer edges of a horizontal bottom wall 66. When operably inserted into box 60 (e.g., as depicted in FIG. 9C), the lower edges of each strip forming divider 70 abuts the upper surface of bottom wall 66, strips 71-1, 71-2 and 71-3 are aligned parallel to end walls 62 and 63 with vertical end edges abutting or adjacent to side walls 64 and 65, and strips 72-1, 72-2 and 72-3 are aligned parallel to side walls 64 and 65 with vertical end edges abutting or adjacent to end walls 62 and 63.

FIG. 9C depicts box 60 after assembled divider 70 has been operably inserted to divide storage region 61 (shown in FIG. 9B) into sixteen separate storage compartments (receiving areas) arranged in four rows and four columns, and each unlabeled drinkware item 50U is inserted into a designated storage compartment with its bottoms surface facing upward (e.g., drinkware item 50U-44 is inserted into storage compartment 61-44 with bottom surface 52U-22 facing away from bottom surface 66). The bottom of each storage compartment is closed by an associated portion of bottom wall 66, and the sides of each compartment are defined by portions of walls 62 to 65 and/or the six strips forming divider 70. For example, storage compartment 61-11 is formed by an associated portion 66-11 of bottom wall 66, portion 63-11 of end wall 63, portion 64-11 of side wall 64, portion 71-11 of strip 71-1 and portion 72-11 of strip 72-1. Note that outer (peripheral) storage compartments are either defined by two strip portions (e.g., corner storage compartments 61-11 and 61-44) or three strip portions (e.g., storage compartment 61-31 is surrounded by a portion end wall 64 and portions of strips 71-2, 71-3 and 72-1), and that interior storage compartments are surrounded by strip portions (e.g., storage compartment 61-22 is surrounded by portions of strips 71-1, 71-2, 72-1 and 72-2). With this arrangement, each of the sixteen unlabeled drinkware items 50U inserted into sixteen storage compartments contacts at least two strip portions (e.g., when drinkware item 50U-11 is inserted into storage compartment 61-11 it contacts strip portions 71-11 and 72-11). As indicated in FIG. 9D, after all sixteen drinkware items 50U have been inserted into their respective storage compartments, an upper box lid 67 is typically folded or otherwise disposed and secured over storage region 61 to retain drinkware items 50U inside box 60 during shipment, for example, to a customizing wholesaler.

Recent improvements in automation (e.g., robotic systems or work cells) have incentivized businesses to replace manual labor (human operators) with robotic systems in the performance of many repetitive manufacturing-related processes, such as promo product customization. However, in many instances state-of-the-art robotic systems are unable to match the speed and accuracy of human operators in the performance of a particular repetitive processes, such as the drinkware customization process described above with reference to FIG. 8. That is, human operators can extract (unpack) unlabeled cups/bottles from boxes and reorient/position the drinkware for processing at peak rates of 20-60 cups/bottles per minute. As explained below with references to FIGS. 10A to 11B below, although state-of-the-art robotic systems can extract unlabeled drinkware from shipping boxes at a rate matching or exceeding human operators under ideal conditions (i.e., when each drinkware item can be extracted with minimum friction from its storage compartment), state-of-the-art robotic systems are unable to match a human operator's ability to avoid or quickly remedy complications that inevitably arise when divider inserts are utilized to separate objects stored in boxes.

FIGS. 10A and 10B depict an exemplary operation involving the automated extraction of an unlabeled drinkware item 50U-22 from shipping box 60 by a state-of-the-art robotic system under ideal conditions. The extraction process involves manipulating a suction cup 80 that is typically attached to an end-of-arm-tool or other end effector disposed at the end of a robot mechanism (not shown). Referring to FIG. 10A, the automated extraction operation is typically performed while box 60 is disposed on a horizontal surface and after box 60 is opened such that bottom surfaces 52 of the sixteen unmarked drinkware items 50U are exposed. As indicated by dashed-line arrow P4, the robot mechanism is controlled to position suction cup 80 over a selected drinkware item (e.g., drinkware item 50U-22 disposed in storage compartment 61-22), then controlled to move suction cup 80 against surface 52U-22 of selected drinkware item 50U-22, and then a low pressure is generated inside suction cup 80 such that selected drinkware item 50U-22 becomes secured to suction cup 80. As indicated by dashed-line arrow P4 in FIG. 10B, the robot mechanism is then controlled to move suction cup 80 vertically upward while box 60 remains stationary, thereby applying an upward force on drinkware item 50U-22 by way of the connection of suction cup 80 to bottom surface 52U-22. Under ideal conditions the sliding friction applied by divider insert 70 on drinkware item 50U-22 is minimal, whereby divider insert 70 remains stationary within box 60 while drinkware item 50U-22 is extracted from storage compartment 61-22 in response to the upward movement of suction cup 80. As indicated by dashed-line arrow P5 in FIG. 10B, low pressure is maintained in suction cup 80 after extraction and the robot mechanism is controlled to transfer selected drinkware cup 50U-22 to a processing location (not shown) for application of a selected brand/logo/slogan.

FIGS. 11A and 11B show an exemplary problematic automated extraction operation involving the dislocation of divider insert 70 during the extraction of drinkware item 50U-22. FIG. 11A depicts the dislocation of divider insert 70 that occurs when friction between one or more of the divider strips 71-1, 71-2, 72-1 and 72-2 surrounding drinkware item 50U-22 is too high (i.e., such that the associated divider strip portions become unintentionally attached or adhered to the side surface of drinkware item 50U-22). Under these problematic conditions, the high friction applied by divider insert 70 on drinkware item 50U-22 causes divider insert 70 to be lifted out of box 60 when drinkware item 50U-22 is extracted from storage compartment 61-22 in response to the upward movement of suction cup 80. The unintentional attachment/adherence of divider insert 70 to drinkware item 50U-22 may occur due environmental conditions (e.g., when excessive moisture causes the strip material to swell and press against the sides of drinkware item 50U-22), or by a feature of the drinkware itself such as a bulge or a lip that may cause it to snag on the divider. When this unintentional attachment/adherence occurs, drinkware item 50U-22 transfers the lifting force applied by suction cup 80 to at least some of the strips forming divider insert 70, thereby pulling the strips upward and undesirably extracting (dislocating) the strips from box 60 and often producing complications that can impede subsequent extraction operations. For example, as depicted in FIG. 11B, the extracted divider insert may dissociate (fall apart) over box 60 and block access to the remaining drinkware items stored in box 60, as indicated by dissociated strips 72-1 and 71-2. The divider may also remain in a raised position that obscures some of the drinkware, thereby preventing their access.

Unlike human operators, state-of-the-art robotic systems are currently unable to identify and prevent or remedy the problematic extraction operation depicted in FIGS. 11A and 11B without significant modification. That is, a human operator can easily identify the adhered-divider problem shown in FIG. 11A by noticing the additional weight of the divider insert when lifting a selected drinkware item with one hand and can prevent dislocation of the divider insert by deploying his/her second hand to press down on the divider insert to break the adherence. Moreover, a human operator can easily identify the blockage problem shown in FIG. 11B and can remedy the problem by manually removing of the dislocated strips. In contrast, although state-of-the-art robotic systems may be able to detect an occurrence of the adhered-divider problem (e.g., by detecting the increased lifting force required to extract the selected drinkware item), it would require significant expense to provide state-of-the-art robotic systems with a second end-tool capable of acting as the human operator's "second hand" to prevent the upward movement of the dislocated divider insert described above with reference to FIG. 11A, and would require significant software and/or hardware modification to address the blockage problem described above with reference to FIG. 11B. Therefore, despite recent advances in automation technology, automated processes like the drinkware customization process described above are currently exclusively performed by human operators.

What is needed is a divider restraining mechanism for a robotic system that can reliably restrain divider inserts during automated object extraction operations (e.g., during the removal of promo drinkware items or other objects from associated containers/boxes). Ideally, what is needed is a low-cost and reliable divider restraining mechanism that can be seamlessly implemented by an existing robotic system (i.e., without requiring significant modification to the robotic system) and facilitates automated promo product customization processing at rates comparable to those currently achieved by human operators.

SUMMARY OF THE INVENTION

The present invention is directed to a divider restraining mechanism that utilizes a movable foot structure to restrain divider inserts during automated extraction operations performed by a robotic system. The divider restraining mechanism is implemented on (connected to) an end-of-arm-tool (end-tool) that is operably connected to the distal end of a robot mechanism (e.g., to the connecting rod of a six-axis pick-and-place robot mechanism). The end-tool also includes an object gripping device (e.g., a vacuum-driven suction cup). During each automated extraction operation the robot mechanism moves the end-tool over a box containing one or more objects (e.g., unlabeled drinkware items) such that the gripping device is operably positioned relative to a selected "target" object (e.g., such that the gripping device is disposed directly over the selected target object), then the robot mechanism moves the end-tool toward the target object (e.g., vertically downward) until the object gripping device is able to grasp the target object, and subsequently moves the end-tool away from the box (e.g., vertically upward) with the selected object securely held by the object gripping device, thereby removing (extracting) the selected object from an associated storage compartment defined by the divider insert in the box. The divider restraining mechanism is characterized in that the foot structure is movably connected to a frame (body) of the end-tool and is configured such that the foot structure applies and maintains a restricting force on one or more portions (strips) of the divider insert that form the storage compartment in which a target object is disposed while the end-tool extracts the target object from the box. That is, the foot structure remains in contact with an upper edge of the divider insert while the robot mechanism moves the object gripping device away from the box, whereby the foot structure applies and maintains the restricting force on the divider insert until the target object is extracted from the box (i.e., until the extraction operation is completed). In this manner, the restricting force applied by the foot structure prevents removal of the divider insert from the box's storage region while the robot mechanism manipulates the end-tool to extract the target object. By providing a divider restraining mechanism having the foot structure described above, the present invention provides a low-cost and reliable solution to the undesirable divider dislocation problem that can be implemented by an existing robotic system (i.e., without requiring significant modification to the robotic system) and facilitates automated extraction operations at rates comparable to those currently achieved by human operators.

In one embodiment, the divider restraining mechanism includes at least one guide rod configured to movably connect the foot structure to the end-tool. In a specific embodiment the end-tool is implemented using a rigid (e.g., plate metal) frame having an upward-facing (first) surface that faces upward/away from the box during object extraction operations, and an opposing downward-facing (second) surface that faces downward/toward the box during object extraction operations. The object gripping device is connected to or otherwise operably disposed on the downward-facing surface of the frame to facilitate the extraction of target objects. Each guide rod extends through a corresponding guide rod opening formed in (defined through) the frame such that the guide rod is slidably movable in an axial direction relative to the frame (e.g., perpendicular to the opposing surfaces of the frame). The foot structure is fixedly attached to a lower (first) end of each guide rod, whereby the foot structure is slidably (movably) connected to the frame by way of the guide rod. In a preferred embodiment each guide rod has a cylindrical cross-section and passes through an associated linear bearing that is fixedly connected to the frame and is configured to precisely align and maintain the guide rod in the axial direction during extraction operations, thereby increasing the reliability of the divider restraining mechanism. In alternative embodiments the guide rod has a keyed cross-section that is configured to constrain the guide rod in a rotational axis about the direction of travel. In some embodiments, axial movement of the foot structure away from the frame is limited by a slide restricting structure (e.g., a cap) that is fixedly attached to an upper (second) end of at least one guide rod. That is, when the foot structure is positioned at a maximum distance below (away from) the end-tool frame, the slide restricting structure contacts either the upward-facing frame surface or an uppermost end of an associated linear bearing, thereby preventing further movement of the guide rod (and the foot structure) away from the frame. Similarly, upward movement of the guide rod (i.e., movement of the foot structure toward the frame) is limited by contact between the foot structure and either the lower plate surface or with a lowermost end of the associated linear bearing. By configuring the divider restraining mechanism such that the foot structure is slidably connected to a plate-like frame structure by way of at least one guide rod and corresponding linear bearings, the present invention reliably applies the desired restraining force to prevent the dislocation of the divider insert during exaction operations.

In a practical embodiment vertical movement of the foot structure relative to the end-tool frame is controlled by two or more parallel guide rods. Preferably each guide rod is restricted to move in a vertical axial direction by way of a corresponding linear bearing that is fixedly connected to the end-tool frame and is connected at its lower end to the foot structure and at its upper end to a corresponding restricting cap. Utilizing multiple parallel guide rods facilitates reliable maintaining the foot structure in a horizontal orientation and avoids undesirable rotation such that the foot structure consistently applies a uniform resisting force onto targeted component strips of the divider insert during each extraction operation. In one embodiment each guide rod is made relatively flexible (e.g., by being formed with a diameter in the range of 3 to 10 mm and comprising a material having a Rockwell hardness in the range of 50 to 120) to both minimize weight and avoid binding during movement of the foot structure relative to the end-tool frame.

In alternative embodiments the divider restraining mechanisms of the present invention utilize foot structures having various shapes and other features that facilitate extraction operations and subsequent processing operations. In some embodiments the foot structure includes a partial (e.g., quarter or half) or full ring-shaped (continuously curved) structure that is maintained parallel to the frame by multiple guide rods and is configured to contact multiple portions (strips) of the divider insert. A benefit of using a half-ring-shaped foot structure is that this configuration facilitates positioning the foot structure over each of the four component strips of the divider insert that form the associated storage compartment occupied by the targeted drinkware item or other object during extraction, thereby preventing a loosely coupled strip from being caught and sliding up with the extracted target object. The half-ring-shaped configuration also facilitates rotation and subsequent hand-off of the extracted target object in a horizontal orientation. In other embodiments the foot structure includes a partial or full square-shaped structure configured to cover all four strips of the divider insert that define and surround the associated storage compartment occupied, e.g., by square-shaped targeted objects. In some embodiments the foot structure is an integral (one piece) structure, and in other embodiments the foot structure is implemented using two or more curved or angled foot portions, each foot portion being independently connected to the frame by at least one guide rod. The use of multiple separate foot structures facilitates the reliable removal of objects close to the edge of a box in cases where the upper edge of the divider insert is significantly below the upper edge of the surrounding box (i.e., by allowing at least one foot portion to enter the box and restrain the divider when another foot portion is prevented from entering the box by the box's upper edge).

In other embodiments the divider restraining mechanism includes a resilient member (e.g., a coil spring disposed between the downward-facing surface of the frame and the foot structure that is configured to bias the foot structure toward the divider insert (i.e., away from the frame). In preferred embodiments the foot structure is provided with a mass that is selected both to generate a sufficient restraining force (i.e., to prevent undesirable extraction of the divider insert), but is also light enough to avoid permanent deformation or other damage to the box and/or divider insert. In some embodiments a divider restraining mechanism may be modified to include a resilient member when, for example, the foot structure's mass is too low and utilizing a heavier replacement foot structure may not be practical, or when movement of the foot structure by gravitational forces alone preclude high-speed extraction operations.

In other embodiments, the present invention is directed to a robot mechanism and a robotic system that utilize the end-tool described above.

BRIEF DESCRIPTION OF THE DRAWINGS

These and other features, aspects and advantages of the present invention will become better understood with regard to the following description, appended claims, and accompanying drawings, where:

FIGS. 4A and 4B are exploded perspective and assembled perspective views, respectively, depicting the divider restraining mechanism according to another embodiment of the present invention;

DETAILED DESCRIPTION OF THE DRAWINGS

The present invention relates to an improvement in robotic systems utilized to process objects packaged in boxes that include divider inserts. The following description is presented to enable one of ordinary skill in the art to make and use the invention as provided in the context of a particular application (i.e., placing brand labels on promotional hand sanitizer bottles) and its requirements. Various modifications to the preferred embodiment will be apparent to those with skill in the art, and the general principles defined herein may be applied to other embodiments. Therefore, the present invention is not intended to be limited to the embodiments shown in the figures and described below but is to be accorded the widest scope consistent with the principles and novel features herein disclosed.

Figure 1:
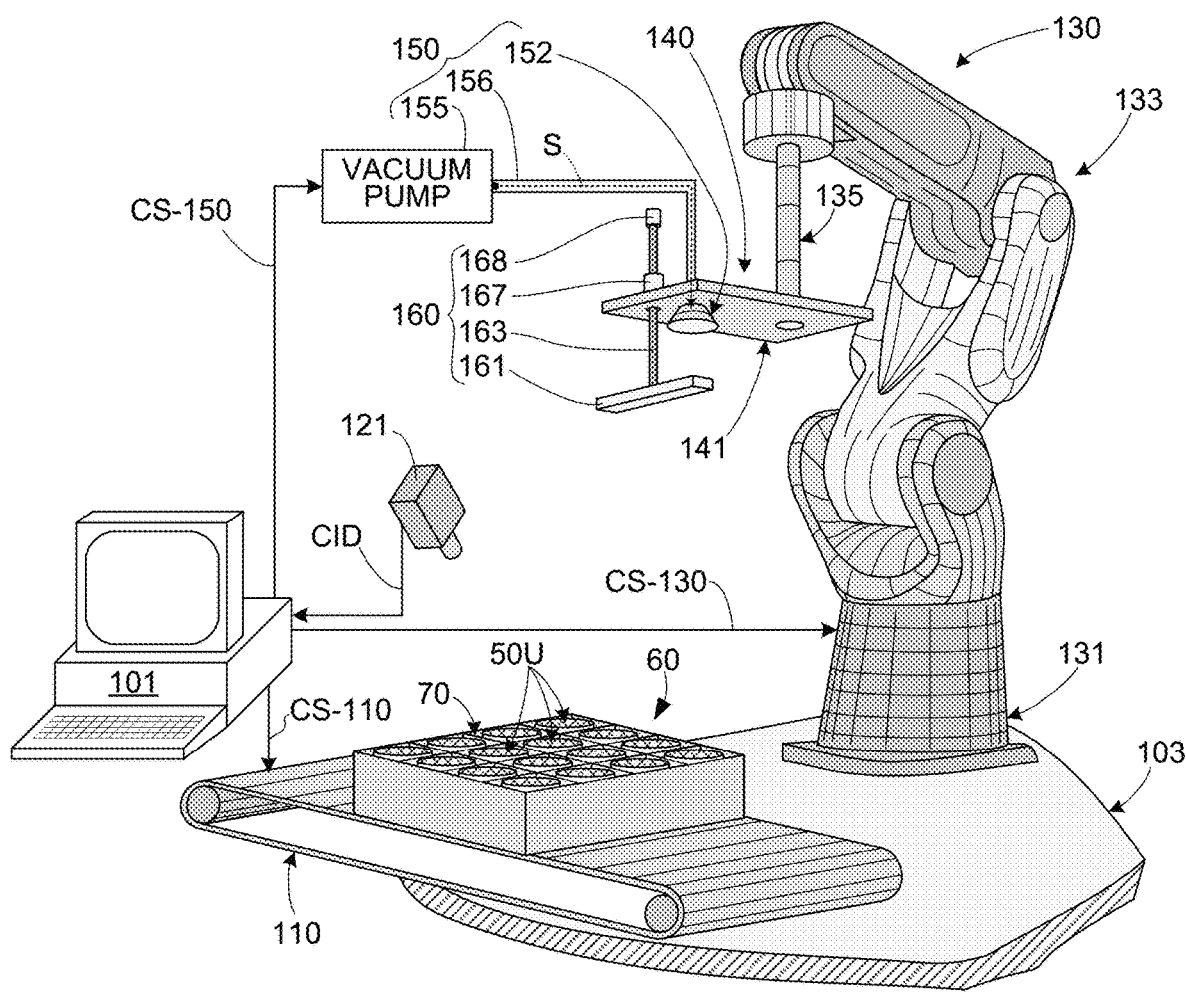
FIG. 1 is a perspective view depicting a robotic system including a generalized divider restraining mechanism according to an exemplary embodiment of the present invention.
Figure 8:
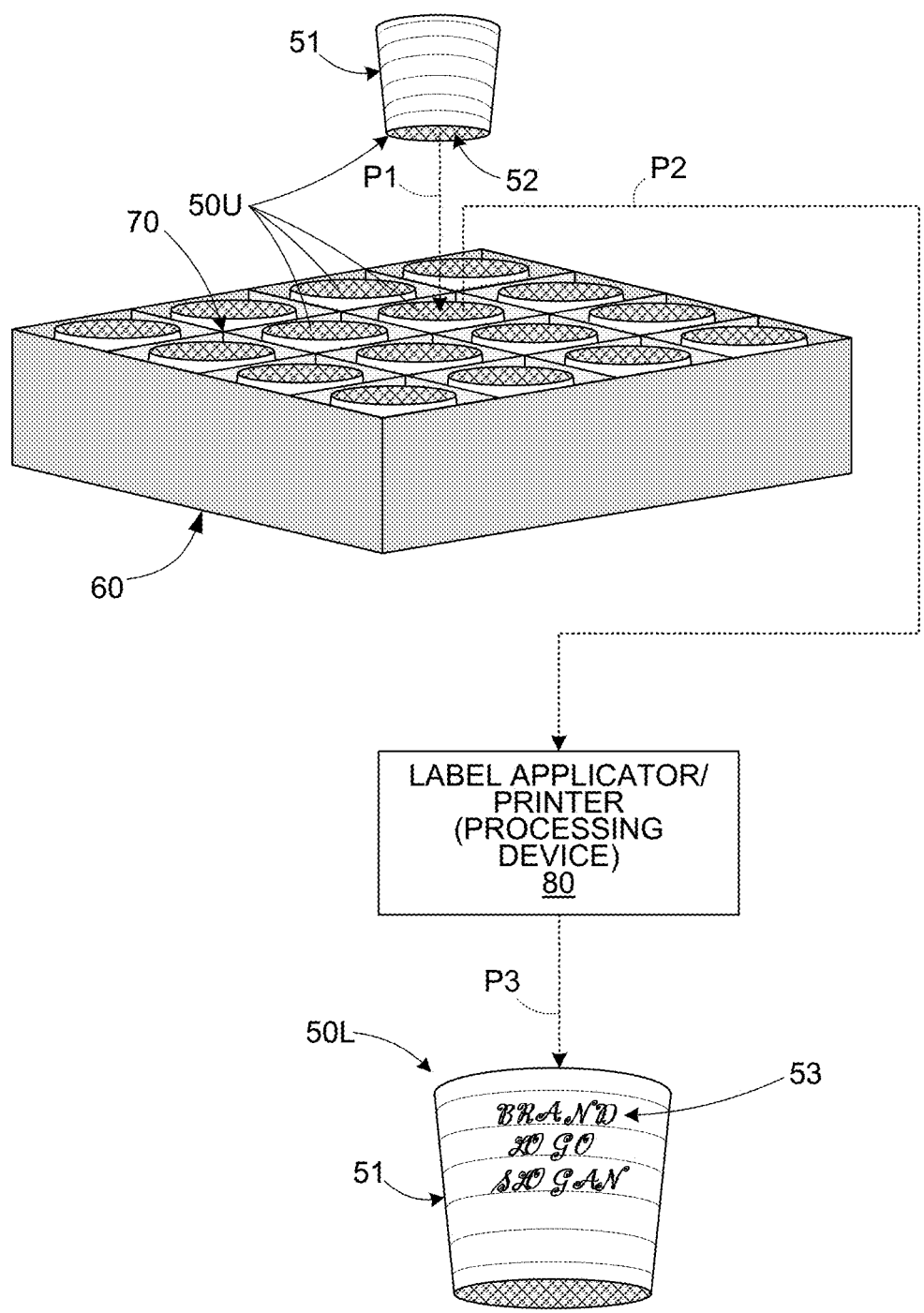
FIG. 8 is a simplified diagram depicting a conventional process involving the packaging, shipping, and customizing promotional objects.
Figure 9A:
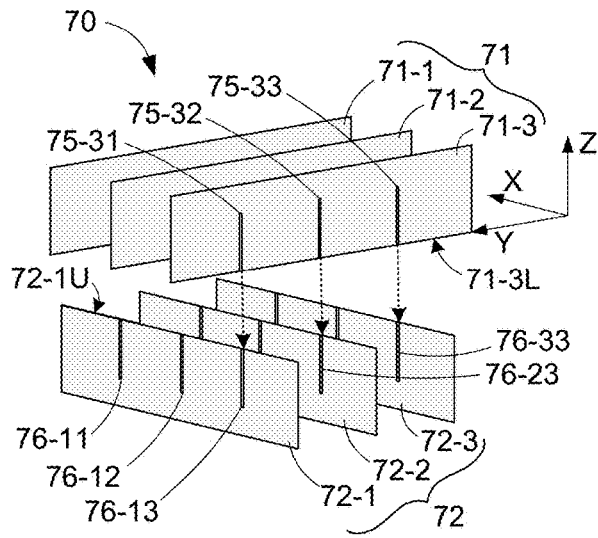
FIGS. 9A, 9B, 9C and 9D are perspective views depicting exemplary objects packaged in a box and separated by a divider insert.
Figure 9B:
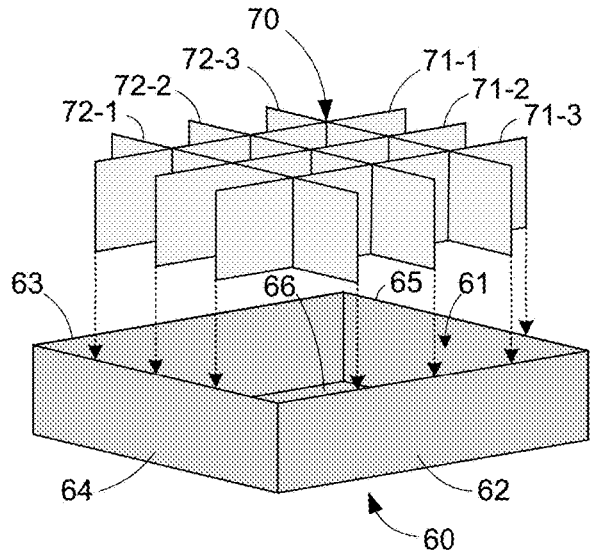
Figure 9C:
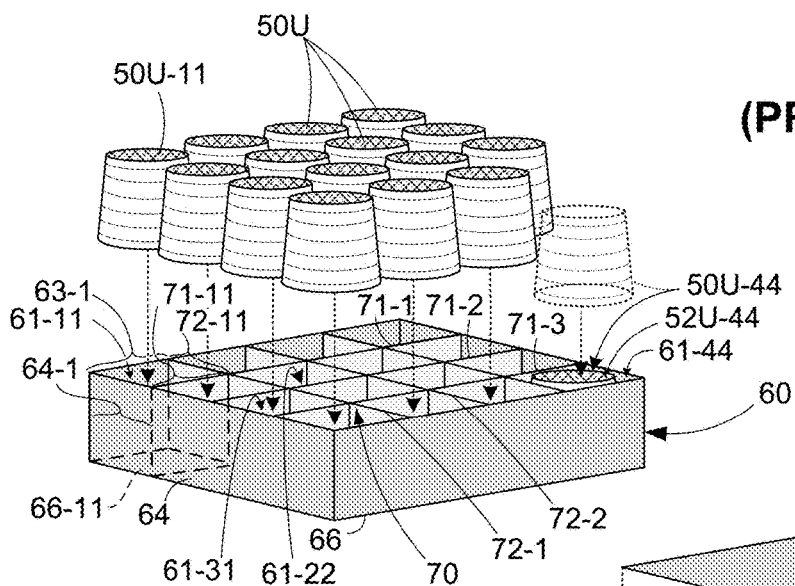
Figure 9D:
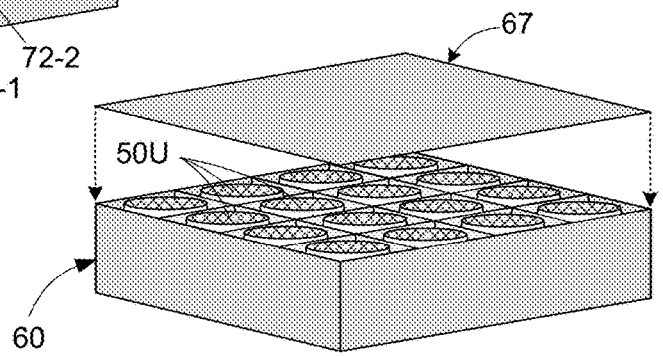
Figure 10A:
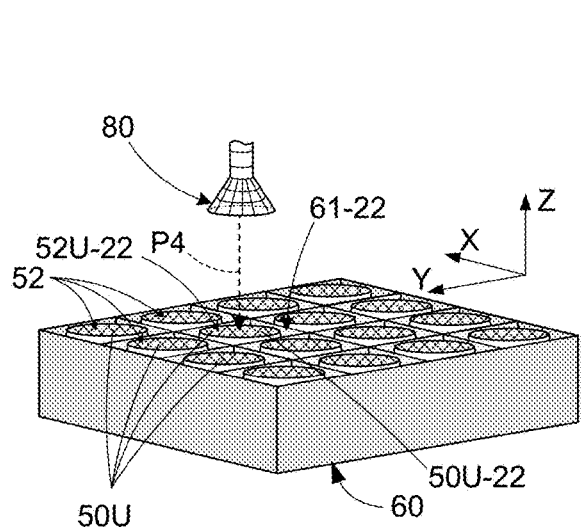
FIGS. 10A and 10B are perspective views depicting an exemplary idealized automated extraction operation.
Figure 10B:
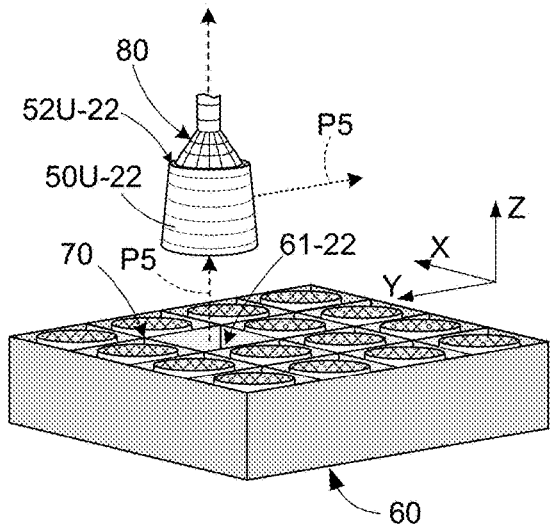
Figure 11A:
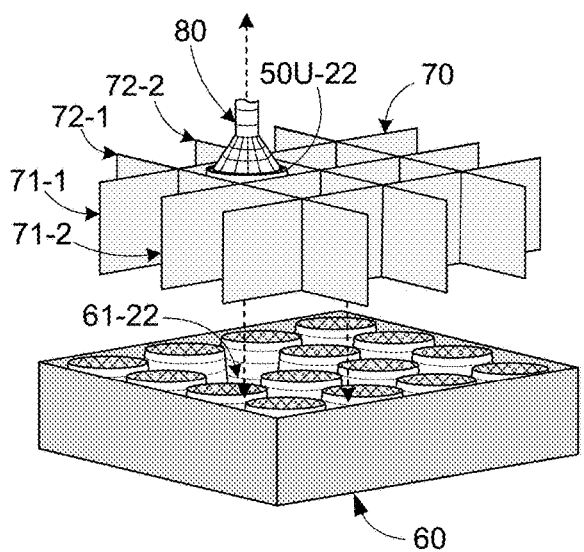
FIGS. 11A and 11B are perspective views depicting an exemplary problematic automated extraction operation that typically occurs using conventional robotic systems.
Figure 11B:
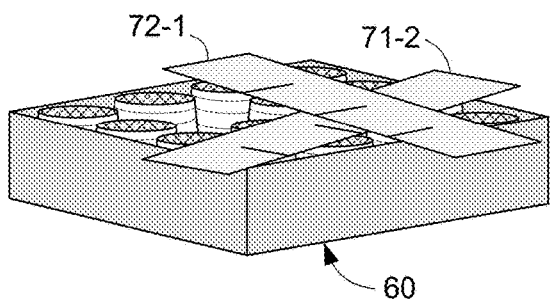

FIG. 1 depicts a simplified exemplary robotic system 100 including an end-of-arm-tool (end-tool) 140 that is controlled by a robot mechanism 130 during an automated production process. According to an aspect of the present invention, end-tool 140 includes a divider restraining mechanism 160 that is configured to restrain a divider insert 70 during automated extraction operations involving the removal of unlabeled drinkware items (objects) 50U that are separated by a divider insert 70 in a box 60. In one embodiment the automated extraction operations described below are performed during the execution of automated promo product customization processes like those described above with reference to FIG. 8. In other embodiments the automated extraction operations described below are performed during another automated production process. For brevity, the following description incorporates the details and features of the exemplary drinkware items 50U, box 60 and divider insert 70 that are described above with reference to FIGS. 8 to 9D. The appended claims are not limited by these depicted details and features unless specified (i.e., the claims are intended to cover a wide range of object types and a wide range of box and divider insert configurations).

Exemplary robotic system 100 utilizes a control unit 101 to coordinate the operations of a conveying mechanism (conveyor) 110, robot mechanism 130 and a gripper control (gripping) mechanism 150. In the exemplary embodiment, gripping mechanism 150 includes a suction cup (object gripping device) 152 that is operably connected to a vacuum pump 155 by a vacuum hose line 156. Additional mechanisms, sensors and structures of robotic system 100 that may be required to perform the automated extraction operations described below are omitted for brevity.

Control unit 101, which is depicted as a personal computer for illustrative purposes, is configured using known techniques to manage power distribution and to coordinate the various operations that achieve the automated object extraction operations described herein. In one embodiment, control unit 101 utilizes a vision system to process current image data CID received from a camera 121 to determine when box 60 is within the operating range of robot mechanism 130 and to select a target drinkware item 50U for extraction. Control unit 101 utilizes the processed image data to control conveyor device 110 using a control signal CS-110 such that box 60 is moved into the operating range of robot mechanism 130, to control robot mechanism 130 using a control signal CS-130 such that end-tool 140 is moved or otherwise manipulated into an operable position over the selected target drinkware item 50U, and to control gripper mechanism 150 using a gripper control signal CS-150 to secure the selected target drinkware item 50U during extraction and transfer to a processing device (not shown). In a preferred embodiment conveyor 110 is configured to maintain box 60 in a substantially horizontal orientation (i.e., such that extraction is necessarily in a vertical direction). In other embodiments a conveyor or other mechanism may present a box in another (i.e., non-horizontal/diagonal) orientation, whereby extraction would be performed in a direction perpendicular to the non-horizontal/diagonal orientation. The various control signals and operations of control unit 101, conveyor 110, robot mechanism 130 and gripping mechanism 150 described herein are understood by those skilled in the art and are therefore not described in additional detail for brevity.

As depicted in FIG. 1, in presently preferred embodiments pick-and-place robot mechanism 130 is implemented by a six-axis robot including a base portion 131 fixedly connected to a rigid base plate 101, a multi-section arm portion 133 extending from base portion 131, and a distal end (control rod) portion 135 disposed at a free (distal) end of arm portion 133. As described below with reference to FIGS. 3A to 3F, six-axis robot mechanism 130 is configured to move and operably position end-tool 140 such that suction cup (object gripping device) 152 operably contacts a target drinkware item to facilitate securing/grasping and lifting target drinkware item from its storage compartment in box 60. Six-axis robot mechanism 130 is also configured to maintain grasping control of the target drinkware item by way of end-tool 140 during transfer to a designated hand-off location (not shown), to optionally rotate the target drinkware item into a desired hand-off (e.g., horizontal) orientation, and to release the target drinkware item at a designated hand-off location. Six-axis robot mechanism 130 may be implemented using a mini six-axis robot (e.g., model LR Mate 200iD provided by Fanuc America Corporation of Rochester Hills, MI, USA). In some embodiments vacuum pump 155 is integrated into six-axis robot 130 using known techniques, and in other embodiments vacuum pump 155 may be a stand-alone system. Mini six-axis robots of this type have the approximate size and reach of a human arm and facilitate reliable pick-and-place and hand-off operations that may be utilized for a wide range of object types and sizes.

Figure 2A:
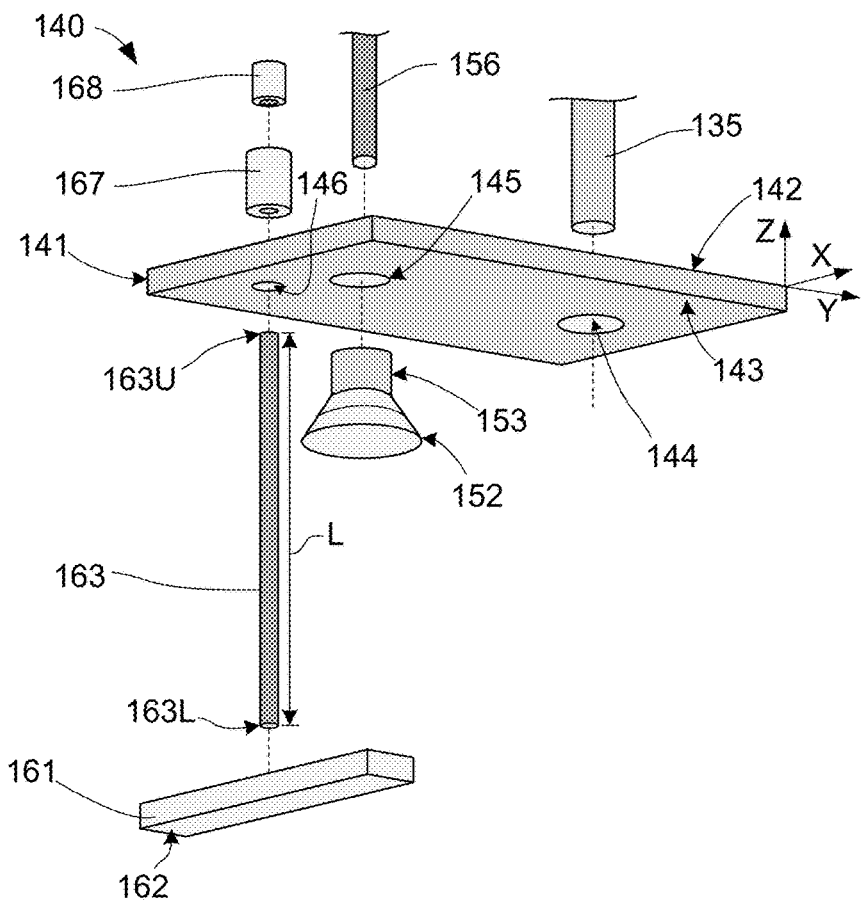
FIGS. 2A and 2B are exploded perspective and assembled perspective views, respectively, depicting the generalized divider restraining mechanism of FIG. 1.
Figure 2B:
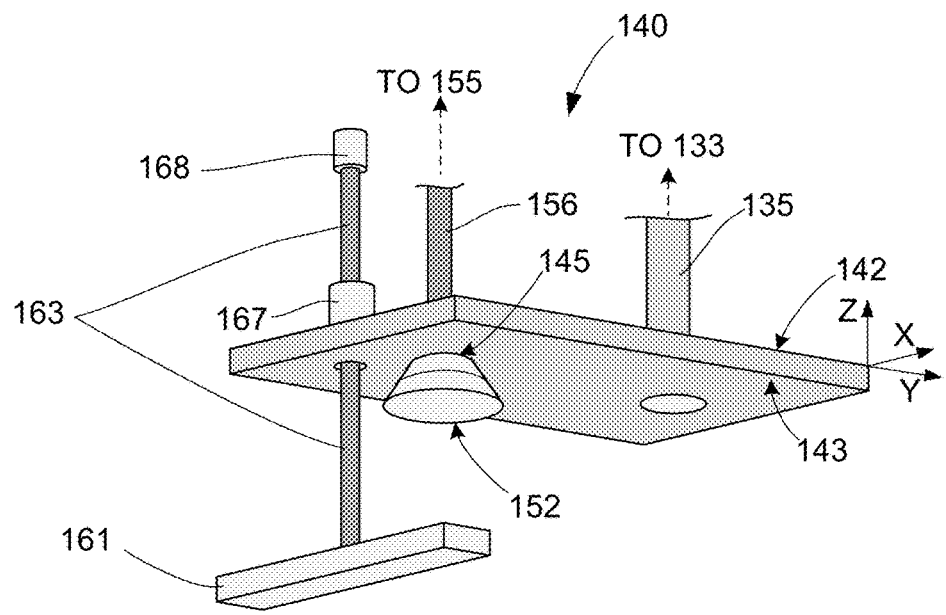

Referring to FIGS. 2A and 2B, end-tool 140 includes a frame 141 that is configured to support suction cup 152 and divider restraining mechanism 160. In the exemplary embodiment frame 141 includes a rigid metal plate structure having an upward-facing (first) surface 142 that, when properly attached to connecting rod 135, faces away from box 60 during extraction operations and an opposing downward-facing (second) surface 143 that faces toward box 60 during extraction operations. Frame 141 is machined, fabricated, or otherwise formed to include various features that facilitate the desired connections to connecting rod 135, suction cup 152 and divider restraining mechanism 160 such that these features are optimally positioned during operations. For example, an end-tool connecting structure 144 is disposed at one end of frame 141 and is configured to facilitate the rigid connection of frame 141 to connecting rod 135. Similarly, a gripper connecting structure 145 is formed near the opposing end of frame 141 to facilitate fixed connection of suction cup 152 to frame 141.

Suction cup 152 is fixedly connected to a gripper base portion 153 that is received in or otherwise connected to gripper connecting structure 145 such that suction cup 152 extends from downward-facing surface 143. Gripper base portion 153 is connected to an end of vacuum hose/line 156 which, as indicated in FIG. 1, is utilized to transfer a suction force S generated by vacuum pump 155 to suction cup 152, whereby suction cup 152 is configured to secure target drinkware items 50U during extraction operations as described below.

As mentioned above, divider restraining mechanism 160 is characterized in that foot structure 161 is movably connected to frame 141 such that it applies a restricting force on a divider insert during each extraction operation. In preferred embodiments, foot structure 161 comprises a rigid material (e.g., metal, ceramic, or plastic) and includes a substantially planar lower surface 162. In the exemplary embodiment, the movable connection of foot structure 161 to frame 141 is achieved by way of fixed connection to a lower end 163L of a guide rod 163 that is slidably connected to frame 141 (i.e., by way of guide rod 163 being received in extending through guide rod opening 146). As described below with reference to FIGS. 3A to 3F, guide rod 163 has a length L (measured between lower end 163L and an upper end 163U) that is determined by a height of drinkware items 50U (i.e., length L is sufficient to facilitate the complete extraction of target drinkware items before foot structure 161 is lifted from divider insert 70). In preferred embodiments divider restraining mechanism 160 also includes at least one of a linear bearing 167 and a slide limiting structure (cap) 168. Linear bearing 167 is fixedly connected to frame 141 and positioned over guide rod opening 146 to maintain guide rod 163 in a vertical (axial) direction (i.e., parallel to the Z-axis) during extraction operations. Cap 168 is fixedly connected to an upper end 163U of guide rod 163 and is larger than both the inside diameter of linear bearing 167 and guide rod opening 146, thereby allowing cap 168 to limit the downward movement of guide rod 163 (i.e., to prevent guide rod 163 from sliding downward entirely through linear bearing 167, e.g., either by contact of cap 168 with linear bearing 167 or, in the absence of linear bearing 167, with upper plate surface 142). In other possible embodiments (not shown) the end-tool frame may have another (i.e., not plate-like) structure, and/or the movable connection of a foot structure to an end-tool may be achieved, using a hinge or other mechanism. In other possible embodiments the foot structure may have various alternative configurations and be produced using various alternative materials.

FIGS. 3A to 3F depict end-tool 140 during an exemplary object extraction operation involving the extraction of target drinkware item 50U-22 from storage compartment 61-22, which is defined by divider insert 70 in the manner described above with reference to FIGS. 8 through 10B. These figures indicate adjacent drinkware items 50U disposed in box 60 for reference.

Figure 3A:
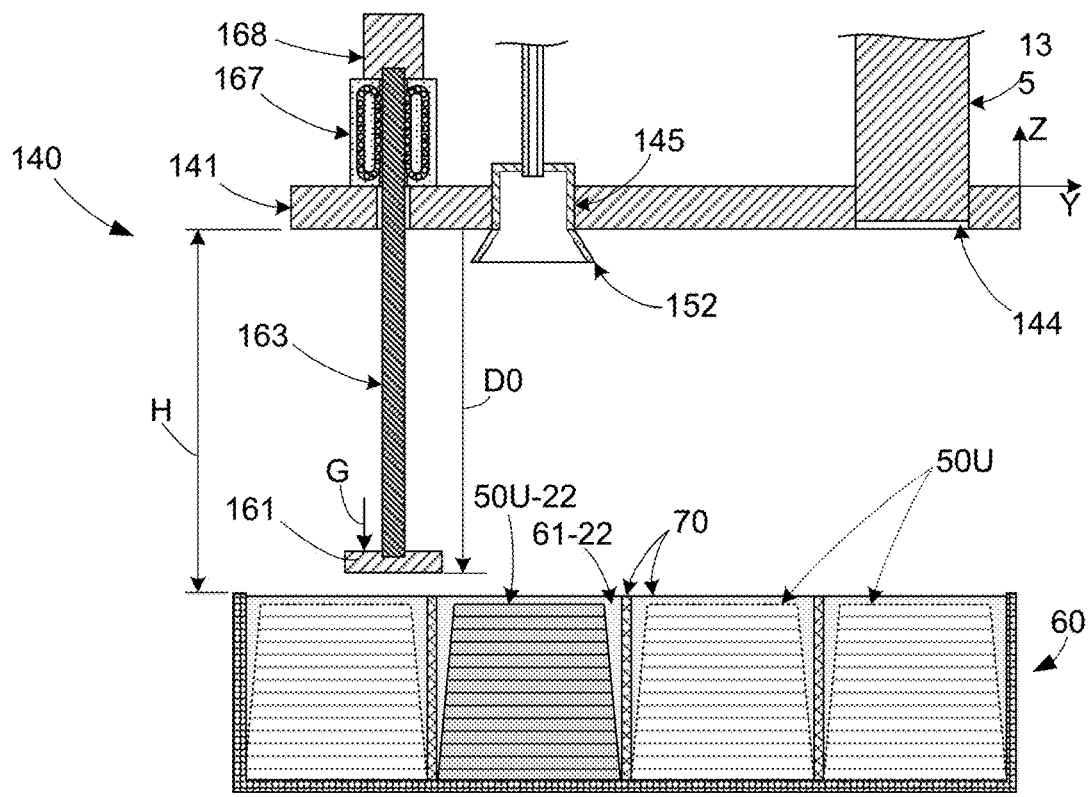
FIGS. 3A, 3B, 3C, 3D, 3E and 3F are cross-sectional side views showing a portion of the robotic system of FIG. 1 during an exemplary object extraction operation performed in accordance with an embodiment of the present invention.

FIG. 3A depicts end-tool 140 at the beginning of the exemplary object extraction operation immediately after robot mechanism 130 (shown in FIG. 1) manipulates connecting rod 135 to position end-tool 140 over box 60 such that suction cup 152 is positioned directly over target drinkware item 50U-22 and guide rod 163 is aligned vertically (i.e., parallel to the Z-axis direction). Because guide rod 163 is aligned vertically, foot structure 161 is pulled downward by gravitational force G, thereby causing guide rod 163 to slide downward in linear bearing 167 until cap 168 abuts the upper surface of linear bearing 167, whereby further movement of guide rod 163 in the downward (−Z-axis) direction is prevented and foot structure 161 is maintained at a maximum distance DO below frame 141. To facilitate the operation of divider restraining mechanism 160, end-tool 140 is positioned a minimum height H above box 60, where minimum height H is greater than maximum distance DO such that foot structure 161 is disposed over (i.e., does not contact) divider insert 70.

Figure 3B:
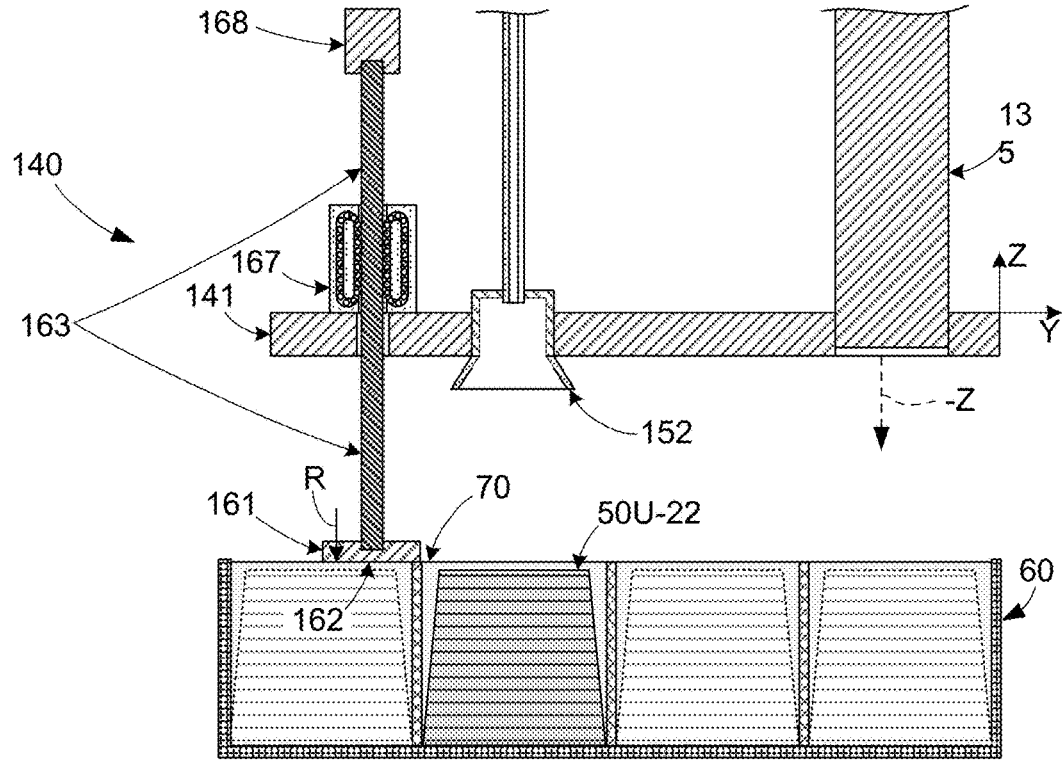

FIG. 3B depicts end-tool 140 at a time slightly later than that depicted in FIG. 3A. The robot mechanism manipulates connecting rod 135 such that end-tool 140 is moving downward (i.e., in the −Z direction) toward box 60. Note that end-tool 140 has moved downward an intermediate distance that is sufficient to cause planar lower surface 162 of foot structure 161 to contact the upper surface of divider insert 70, but not far enough for suction cup 152 to contact target drinkware item 50U-22. At this point further downward movement of foot structure 161 and guide rod 163 is impeded by divider insert 70, so subsequent downward movement of frame 141 causes guide rod 163 to slide within linear bearing 167 such that cap 168 is separated by an increasingly large section of guide rod 163 from linear bearing 167. In addition, the weight of foot structure 161 (and guide rod 163) produces a gravity-driven restraining force R on divider insert 70.

Figure 3C:
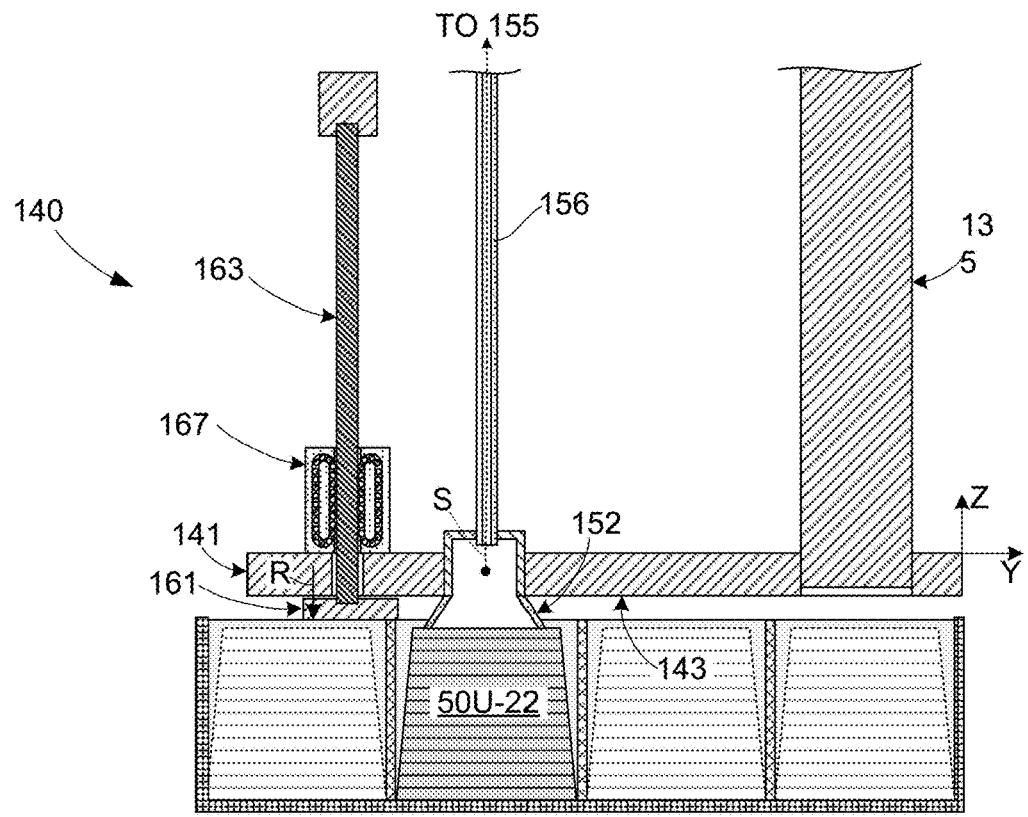

FIG. 3C depicts end-tool 140 at a subsequent time from that depicted in FIG. 3B when the robot mechanism has manipulated connecting rod 135 to move frame 141 downward until suction cup 152 contacts target drinkware item 50U-22, and suction force S is transmitted from vacuum pump 155 (shown in FIG. 1) via vacuum hose/line 156 to suction cup 152. At this point most of guide rod 163 has slid through linear bearing 167, and foot structure 161 continues to apply restraining force R on divider insert 70. Note that further upward movement of guide rod 163 is restricted by contact between foot structure 161 and downward-facing surface 143 of frame 141.

Figure 3D:
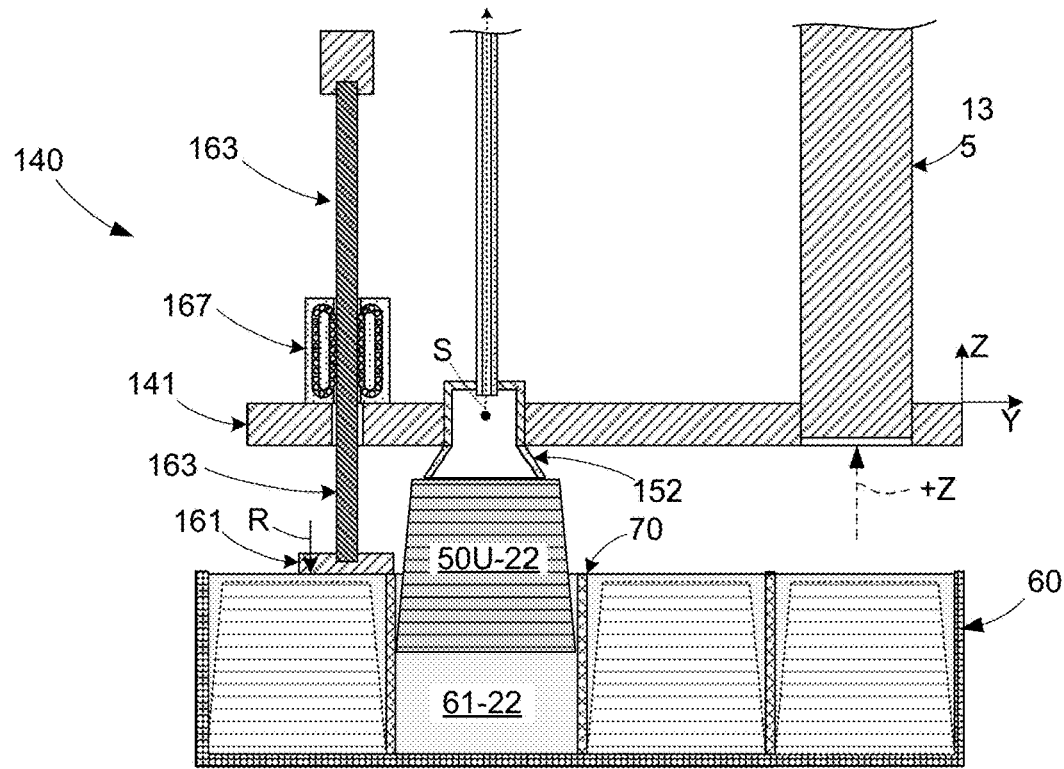

FIG. 3D depicts end-tool 140 at a subsequent time from that depicted in FIG. 3C when the robot mechanism manipulates connecting rod 135 to move frame 141 upward (in the +Z axial direction) with target drinkware item 50U-22 securely held by suction force S transmitted to suction cup 152. As indicated, the upward movement of suction cup 152 pulls target drinkware item 50U-22 partially out of associated storage compartment 61-22. Because the amount of upward movement is significantly less than the length of guide rod 163, foot structure 161 continues to apply restraining force R on divider insert 70, thereby preventing the undesirable upward movement (extraction) of divider insert 70.

Figure 3E:
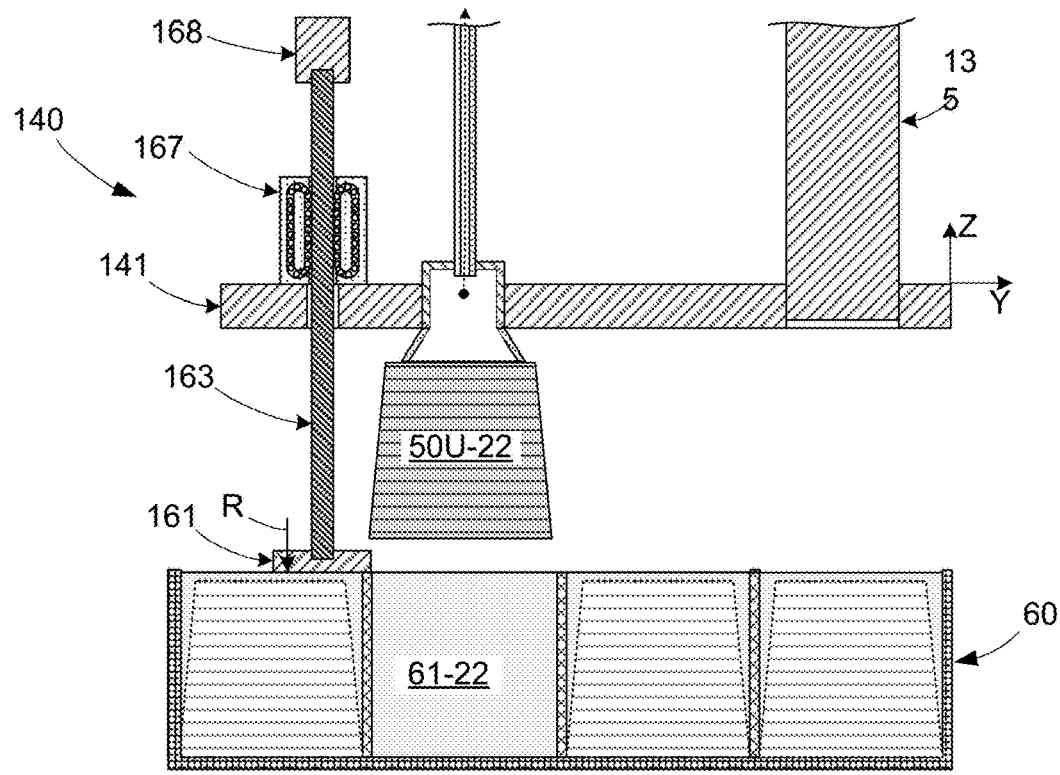

FIG. 3E depicts end-tool 140 at a subsequent time from that depicted in FIG. 3D when the robot mechanism manipulates connecting rod 135 to move frame 141 further upward such that target drinkware item 50U-22 is fully extracted from box 60. Because frame 141 has not returned to original height H (shown in FIG. 3A), cap 168 is still located a distance above linear bearing 167 so guide rod 163 continues to slide within linear bearing 167 and foot structure 161 remains in contact with divider insert 70. Because foot structure 161 is still in contact with divider insert 70, foot structure 161 continues to apply restraining force R on divider insert 70, thereby assuredly preventing the removal of divider insert 70 from the storage region of box 60 during the extraction of target drinkware item 50U-22.

Figure 3F:
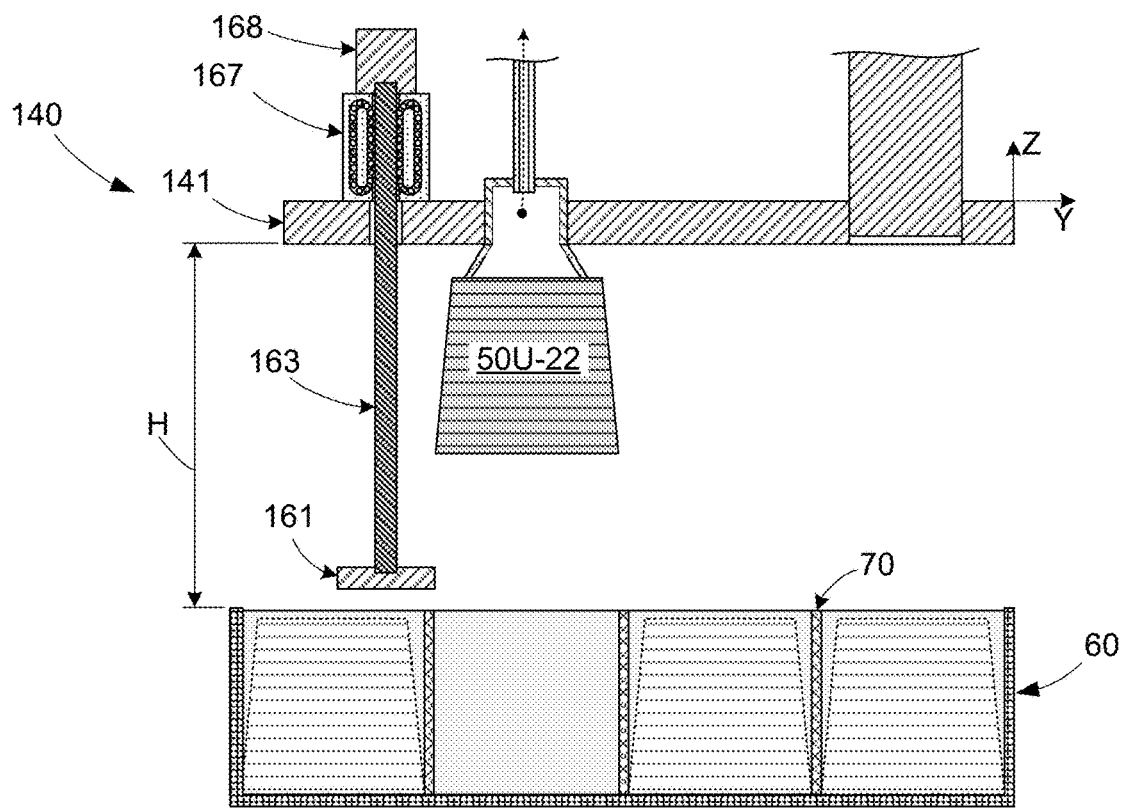

FIG. 3F depicts end-tool 140 at the end of the extraction operation when frame 141 has been lifted to its original height H over box 60, whereby cap 168 is lifted upward by contact with linear bearing 167, thereby lifting guide rod 163 and, consequentially, lifting foot structure 161 from divider insert 70.

For descriptive purposes guide rod 163 is depicted as being substantially longer than required to perform the extraction operation depicted in FIGS. 3A to 3F. In practical embodiments, the length of guide rod 163 may be shorter, provided it is long enough for target drinkware item 50U-22 to clear the upper edge of box 60 when fully extracted from storage compartment 61-22.

FIGS. 4A and 4B depict an end-tool 100A according to a second exemplary embodiment. Like the generalized embodiment described above, end-tool 100A includes a rigid plate-like frame 141A including an end-tool connecting structure 144A configured for connection to the connecting rod of a robot mechanism (not shown), a suction cup 152A fixedly connected to frame 141A by way of a corresponding gripper mechanism attachment structure 145A, and a divider restraining mechanism 160A that is movably connected to frame 141A in a manner similar to that described above. That is, end-tool 100A may be used in place of generalized end-tool 100 to perform the extraction operation described above with reference to FIGS. 3A to 3F.

End-tool 100A differs from generalized end-tool 100 in that divider restraining mechanism 160A utilizes multiple guide rods 163A-1 to 163A-2 to movably connect foot structure 161A to frame 141A. Specifically, divider restraining mechanism 160A includes a first guide rod 163A-1 positioned to extend vertically through a first guide rod opening 146A-1 defined through the frame 141A, a second guide rod 163A-2 positioned to extend vertically through a second guide rod opening 146A-2, a third guide rod 163A-3 positioned to extend vertically through a third guide rod opening 146A-3, and a fourth guide rod 163A-4 positioned to extend vertically through a fourth guide rod opening 146A-4. Foot structure 161A is fixedly attached to the lower end of each guide rod 163A-1 to 163A-2 in the manner described above with reference to generalized foot structure 160. Also, similar to generalized end-tool 100, in a preferred embodiment the movement of each guide rod 163A-1 to 163A-2 relative to frame 141A is restricted to the vertical (Z-axis) direction by a corresponding linear bearing 167A-1 to 167A-4 that is fixedly connected to frame 141A. In this case linear bearings 167A-1 to 167A-4 are sleave-type structures having cylindrical lower portions sized to fit into corresponding guide rod openings 146A-1 to 146A-4 and having ring-type upper portions that abut upper surface 142A (e.g., as indicated in FIG. 4B). During assembly guide rods 163A-1 to 163A-2 are coupled to (i.e., trained through the cylindrical center opening of) corresponding linear bearing 167A-1 to 167A-4, respectively, whereby movement of guide rod 163A-1 is restricted by linear bearing 167A-1 to linear movement in a first axial Z1 direction, guide rod 163A-2 is restricted by linear bearing 167A-2 to linear movement in a second axial Z2 direction, guide rod 163A-3 is restricted by linear bearing 167A-3 to linear movement in a third axial Z3 direction, and guide rod 163A-4 is restricted by linear bearing 167A-4 to linear movement in a fourth axial Z4 direction, where axial directions Z1 to Z4 are parallel to each other. In a presently preferred embodiment, each guide rod 163A-1 to 163A-2 has a cylindrical cross section having a diameter D in the range of 3 to 10 nanometers (nm) and is made using a relatively flexible material (e.g., a metal or plastic having a Rockwell hardness in the range of 50 to 120.

Figure 5:
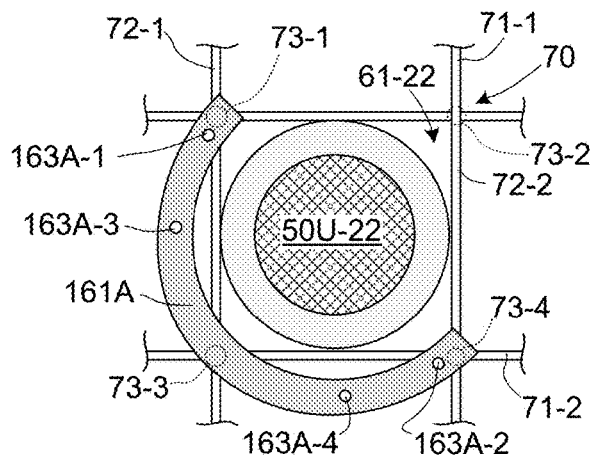
FIG. 5 is a simplified top view showing a foot structure of the divider restraining mechanism of FIG. 4B during an exemplary object extraction operation.

FIG. 5 is a simplified top view depicting contact between foot structure 161A and divider insert 70 during an extraction operation involving end-tool 140A (see FIGS. 4A and 4B). Specifically, FIG. 5 depicts foot structure 161A during the portion of the extraction operation shown in FIG. 3B or 3C (i.e., when foot structure 161A contacts the upper edge of divider insert 70 and while target drinkware item 50U-22 still occupies associated storage compartment 61-22). According to another aspect of the present embodiment, foot structure 161A is implemented as a half-ring-shaped (i.e., 180°) structure that is maintained parallel to frame 141A by the guide rods 163A-1 to 163A-4. In addition, end-tool 140A (see FIGS. 4A and 4B) maintains divider restraining mechanism 160A over the box such that foot structure 161A is positioned over each of the four strips 71-1, 71-2, 72-1 and 72-2 that form storage compartment 61-22, whereby any of strips 71-1, 71-2, 72-1 and 72-2 adhered to target drinkware item 50U-22 would contact foot structure 161A when drinkware item 50U-22 is vertically extracted from storage compartment 61-22. In the disclosed embodiment, opposing end portions of foot structure 161A are disposed over kitty-corner intersections 73-1 and 73-2 (i.e., where strips 71-1 and 71-1 and strips 71-2 and 72-2 intersect, respectively). A benefit for using foot structure 161A is that the half-ring-shaped configuration provides contact with multiple portions of divider insert 70 while facilitating a 90° rotation of target drinkware item 50U-22 after extraction (i.e., from the vertical orientation shown in FIG. 5 to a horizontal orientation) so that target drinkware item 50U-22 can be handed off for subsequent processing in the horizontal orientation.

FIGS. 6A to 6D depict alternative foot structure configurations according to additional specific embodiments, each being depicted using the top view orientation described above with reference to FIG. 5.

Figure 6A:
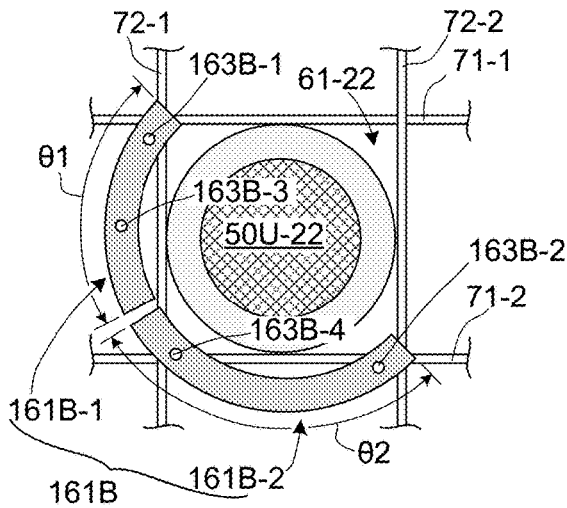
FIGS. 6A, 6B, 6C and 6D are simplified top views showing foot structures of divider restraining mechanisms according to alternative embodiments of the present invention.

FIG. 6A depicts a foot structure 161B including two separate curved foot portions 161B-1 and 161B-2 that are independently connected by at least one associated guide rod to the end-tool frame (not shown). That is, curved foot portion 161B-1 is connected to the lower end of (first) guide rods 163B-1 and 163B-3, and curved foot portion 161B-2 is connected to the lower end of (second) guide rods 163B-2 and 163B-4. Similar to foot structure 161A (FIG. 5), curved foot portions 161B-1 and 161B-2 collectively form a substantially continuous half-ring-shaped structure that is positioned over (i.e., contacts each of) the four strips 71-1, 71-2, 72-1 and 72-2 that define and surround storage compartment 61-22. In one embodiment, curved foot portion 161B-1 defines an arc θ1 that is less than 90° and curved foot portion 161B-2 defines an arc θ2 that is greater than 90°.

Figure 6B:
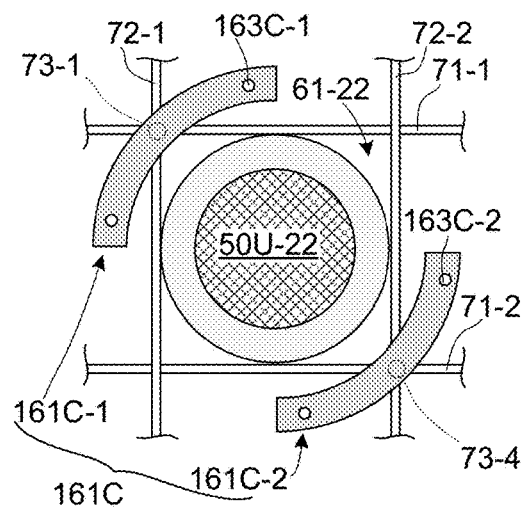

FIG. 6B depicts another foot structure 161C made up of two curved foot portions 161C-1 and 161C-2 that are disposed on opposite sides of storage compartment 61-22. Similar to foot structure 161B (FIG. 6A), curved foot portions 161C-1 and 161C-2 that are independently connected by at least one associated guide rod to the end-tool frame (i.e., curved foot portion 161C-1 is connected to (first) guide rod 163C-1 and curved foot portion 161C-2 is connected to (second) guide rod 163B-2). In addition, curved foot portions 161C-1 and 161C-2 are collectively positioned over (i.e., collectively contact or otherwise prevent the undesirable extraction of) all four strips 71-1, 71-2, 72-1 and 72-2 that define and surround storage compartment 61-22. This configuration allows foot portion 161C-1 to move vertically independent of foot portion 161C-2, thereby facilitates the reliable removal of objects close to the edge of a box in cases where the upper edge of the divider insert is significantly below the upper edge of the surrounding box (e.g., by allowing foot portion 161C-1 to enter the box and contact the divider when foot portion 161C-2 is prevented from entering the box by the box's upper edge).

Figure 6C:
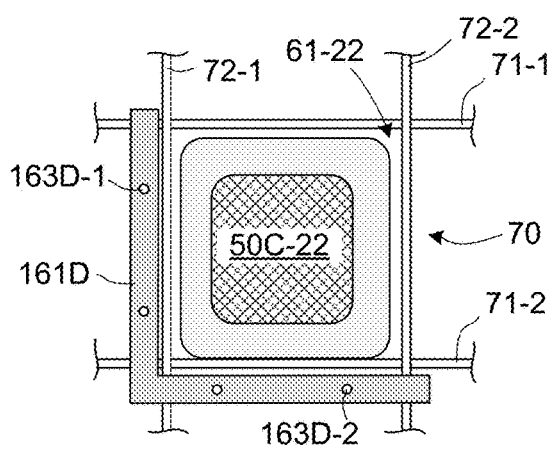

FIG. 6C depicts a fourth foot structure 161D made up of two straight sections integrally connected to form a 90° angle (i.e., forming two sides of a square). Similar to foot structure 161A (FIG. 5), angled foot structure 161D is connected by guide rods 163D-1 and 163D-2 to an associated end-tool frame (not shown) such that the two straight sections are collectively positioned over all four strips 71-1, 71-2, 72-1 and 72-2 that define and surround storage compartment 61-22. This square-shaped foot structure configuration provides additional clearance for extracting target objects having square cross-sections (e.g., as indicated by drinkware item 50C-22).

Figure 6D:
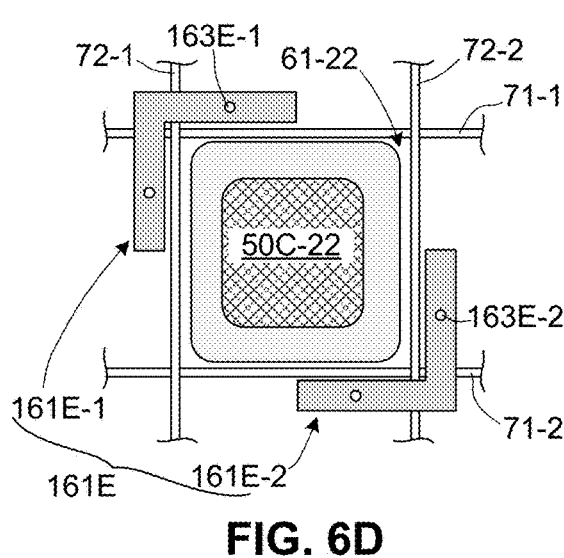

FIG. 6D depicts another foot structure 161E made up of two 90° angled foot portions 161E-1 and 161E-2 that are disposed on opposite sides of storage compartment 61-22. Similar to foot structure 161C (FIG. 6A), angled foot portions 161E-1 and 161E-2 that are independently connected by (first) guide rod 163E-1 and (second) guide rod 163E-2, respectively, to an associated end-tool frame (not shown), and are collectively positioned over all four strips 71-1, 71-2, 72-1 and 72-2 that define and surround storage compartment 61-22. This configuration provides the advantages described above with reference to foot structure 161C (FIG. 6B) and provide the addition advantage of providing additional clearance for extracting target objects having square cross-sections (e.g., as indicated by drinkware item 50C-22).

Figure 7A:
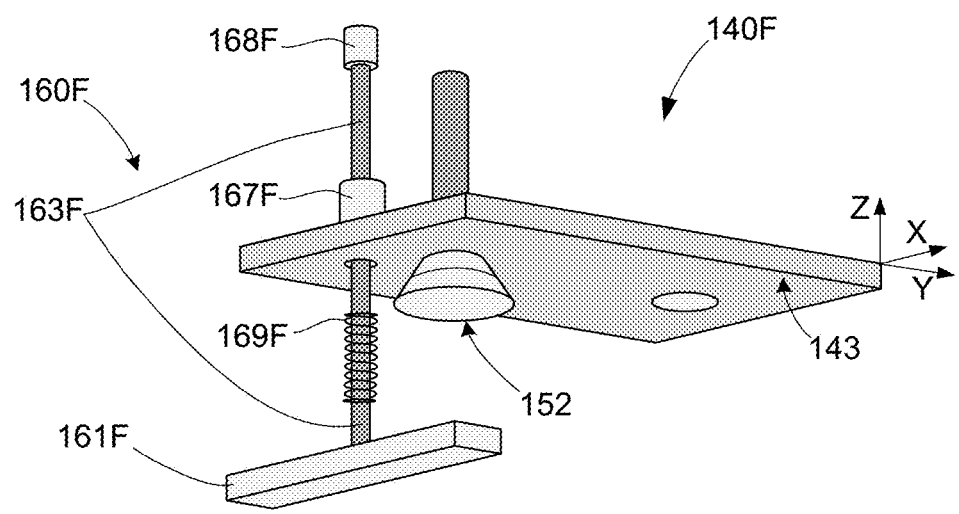
FIGS. 7A and 7B are exploded perspective and cross-sectional side views, respectively, depicting a divider restraining mechanism according to another alternative embodiment of the present invention.
Figure 7B:
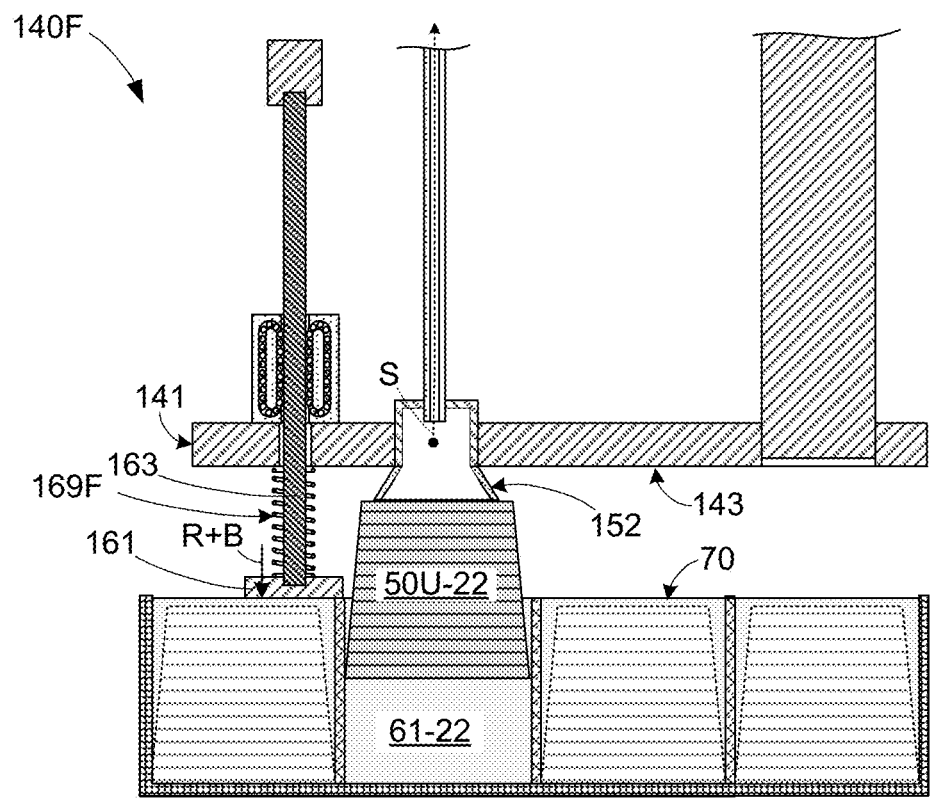

FIGS. 7A and 7B depict an end-tool 140F including a divider restraining mechanism 160F according to another embodiment. For brevity, end-tool 140F is implemented using the generalized structures and features described above with reference to end-tool 140 (see FIGS. 2A and 2B, described above). Divider restraining mechanism 160F includes a guide rod 163F that is restricted to move in an axial direction by an associated linear bearing 162F and restricted by an end cap 168F. End-tool 140F differs from the generalized structure in that divider restraining mechanism 160F further includes a coil spring (resilient member) 169F that is mounted around a lower portion of guide rod 163F such that it is disposed between downward-facing surface 143 of frame 141 and foot structure 161F. Resilient member 169F such that when frame 141 is close enough to box 60 to compress coil spring 169F (e.g., as indicated in FIG. 7B, when suction cup 152 is beginning to lift target drinkware item 50U-22 from storage compartment 61-22), coil spring 169F applies a biasing force B (i.e., in addition to a gravity-driven restricting force R), thereby further biasing foot structure 161F toward divider insert 70. In preferred embodiments foot structure 161F has a sufficient mass to generate a restraining force R sufficient to prevent undesirable extraction of divider insert 70. Coil spring 169F (or another resilient member) may be utilized, for example, when the mass of foot structure 161F is found to be insufficient to prevent undesirable extraction of divider insert 70, or when the movement of foot structure 161F by gravitational forces alone may preclude high-speed extraction operations (e.g., when objects are extracted from boxes in a diagonal or horizontal direction).

Although the present invention has been described with respect to certain specific embodiments, it will be clear to those skilled in the art that the inventive features of the present invention are applicable to other embodiments as well, all of which are intended to fall within the scope of the present invention. For example, although described with specific reference to the automated extraction of drinkware items 50U stored in box 60 and separated by divider insert 70, the divider restraining mechanisms described above may be utilized in any automated extraction operation involving the extraction of other objects from a wide range of containers in which the objects are separated by a divider insert.

The invention claimed is:

1. An end-tool for a robotic system, the robotic system including a robot mechanism configured to manipulate the end-tool during automated extraction operations, each said automated extraction operation involving the removal of an object from an associated storage compartment defined in a storage region of a box, each said associated storage compartment being at least partially defined by a divider insert disposed in the storage region of the box, the end-tool comprising:
 a frame operably connected to the robot mechanism;
 an object gripping device fixedly connected to the frame and configured to secure a target object during each said extraction operation such that said target object is extracted from an associated said storage compartment when said robot mechanism moves the end-tool away from the box during said each extraction operation; and
 a divider restraining mechanism including a foot structure that is movably connected to the frame and configured to apply a restricting force on the divider insert during each said extraction operation such that the applied restricting force prevents removal of the divider insert from the storage region while the robot mechanism manipulates the end-tool to extract the target object.

2. The end-tool of claim 1,
 wherein the frame comprises a plate structure having a first surface that faces away from the box during each said extraction operation and an opposing second surface,
 wherein the object gripping device is disposed on the second surface,
 wherein the divider restraining mechanism further comprises at least one guide rod extending through a corresponding guide rod opening defined through the frame, and
 wherein the foot structure is fixedly attached to a first end of said at least one guide rod.

3. The end-tool of claim 2,
 wherein the divider restraining mechanism further comprises at least one linear bearing fixedly connected to the frame and aligned in an axial direction that is perpendicular to said opposing first and second surfaces, and
 wherein each said guide rod is movably disposed in a corresponding said linear bearing such that movement of said each guide rod is restricted by said each corresponding linear bearing to linear movement in the axial direction.

4. The end-tool of claim 3, wherein the divider restraining mechanism further comprises a slide restricting structure fixedly attached to a second end of the guide rod such that movement of the guide rod in a first direction of said axial direction is restricted by the slide restricting structure, and movement of the guide rod in a second direction of said axial direction is restricted by the foot structure.

5. The end-tool of claim 2, wherein the object gripping device comprises a suction cup.

6. The end-tool of claim 2,
 wherein the divider restraining mechanism includes a first guide rod and a second guide rod, the first guide rod extending through a first guide rod opening defined through the frame, and the second guide rod extending through a second guide rod opening defined through the frame, and
 wherein the foot structure is fixedly attached to both of said first and second guide rods.

7. The end-tool of claim 6, wherein the divider restraining mechanism further comprises:
 a first linear bearing fixedly connected to the frame and extending through the first guide rod opening; and
 a second linear bearing fixedly connected to the frame and extending through the second guide rod opening,
 wherein the first guide rod is coupled to the first linear bearing such that movement of the first guide rod is restricted by the first linear bearing to linear movement in a first axial direction,
 wherein the second guide rod is coupled to the second linear bearing such that movement of the second guide rod is restricted by the second linear bearing to linear movement in a second axial direction, and
 wherein the first axial direction is parallel to the second axial direction.

8. The end-tool of claim 6, wherein each of the first and second guide rods has a diameter in the range of 3 to 10 mm and comprises a material having a Rockwell hardness in the range of 50 to 120.

9. The end-tool of claim 6, wherein the foot structure comprises at least a partial ring-shaped structure that is maintained parallel to the frame by the first and second guide rods and is configured to contact portions of the divider insert that surround the associated storage compartment occupied by the targeted object.

10. The end-tool of claim 9,
 wherein said divider insert comprises a plurality of intercrossing strips and said associated storage compartment is defined by four intercrossing strips of said plurality of intercrossing strips,
 wherein foot structure comprises a single-piece half-ring-shaped structure that is positioned to contact each of said four intercrossing strips during said extraction operation.

11. The end-tool of claim 6, wherein the foot structure comprises two or more separate foot portions including a first foot portion connected to the first guide rod and a second foot portion connected to the second guide rod.

12. The end-tool of claim 11, wherein the first and second foot portions collectively contact each of said four intercrossing strips during said extraction operation.

13. The end-tool of claim 11, wherein the first and second portions of the foot structure comprise either curved or angled foot portions.

14. The end-tool of claim 1, wherein the divider restraining mechanism further comprises a resilient member configured to bias the foot structure away from the frame.

15. A robot mechanism configured to manipulate an end-tool during automated extraction operations, each said automated extraction operation involving the removal of an object from an associated storage compartment defined in a storage region of a box, each said associated storage compartment being at least partially defined by a divider insert disposed in the storage region of the box, wherein the end-tool comprises:

a frame operably connected to the robot mechanism;

an object gripping device fixedly connected to the frame and configured to secure a target object during each said extraction operation such that said target object is extracted from an associated said storage compartment when said robot mechanism moves the end-tool away from the box during said each extraction operation; and a divider restraining mechanism including a foot structure that is movably connected to the frame and configured to apply a restricting force on the divider insert during each said extraction operation such that the applied restricting force prevents removal of the divider insert from the storage region while the robot mechanism manipulates the end-tool to extract the target object.

16. The robot mechanism of claim 15, wherein the robot mechanism includes a base portion, a multi-section arm portion extending from the base portion, and a connecting rod disposed at a distal end of said arm multi-section portion and an end-tool, and wherein the frame of the end-tool is connected to the connecting rod.

17. A robotic system including a robot mechanism configured to manipulate an end-tool during automated extraction operations, each said automated extraction operation involving the removal of said target object from an associated storage compartment defined in a storage region of a box, each said associated storage compartment being at least partially defined by a divider insert disposed in the storage region of the box, wherein the end-tool comprises:

a frame operably connected to the robot mechanism;

an object gripping device fixedly connected to the frame and configured to secure a target object during each said extraction operation such that said target object is extracted from an associated said storage compartment when said robot mechanism moves the end-tool away from from the box during said each extraction operation; and a divider restraining mechanism including a foot structure that is movably connected to the frame and configured to apply a restricting force on the divider insert during each said extraction operation such that the applied restricting force prevents removal of the divider insert from the storage region while the robot mechanism manipulates the end-tool to extract the target object.

18. The robotic system of claim 17, wherein the object gripping device comprises a suction cup connected to the frame and configured to secure the target object during each said extraction operation in response to a suction force generated by a vacuum pump, and wherein the robotic system further comprises a control unit configured to transmit control signals to the robot mechanism and to the vacuum pump.

* * * * *